(12) United States Patent
Calvel et al.

(10) Patent No.: US 10,046,531 B2
(45) Date of Patent: Aug. 14, 2018

(54) MOULD FOR VULCANISING A TIRE COMPRISING MOVABLE ELEMENTS OBTAINED BY LASER SINTERING

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Romain Calvel, Clermont-Ferrand (FR); Anthony Gueugneau, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 0 days.

(21) Appl. No.: 15/327,910

(22) PCT Filed: Jul. 10, 2015

(86) PCT No.: PCT/FR2015/051908
§ 371 (c)(1),
(2) Date: Jan. 20, 2017

(87) PCT Pub. No.: WO2016/012690
PCT Pub. Date: Jan. 28, 2016

(65) Prior Publication Data
US 2017/0197374 A1    Jul. 13, 2017

(30) Foreign Application Priority Data

Jul. 22, 2014   (FR) .................................. 14 570062

(51) Int. Cl.
*B29D 30/06*   (2006.01)
*B22F 3/105*   (2006.01)
(Continued)

(52) U.S. Cl.
CPC ........ *B29D 30/0606* (2013.01); *B22F 3/1055* (2013.01); *B22F 5/007* (2013.01);
(Continued)

(58) Field of Classification Search
CPC ........ B29D 30/0606; B29D 2030/0617; B29C 33/10; B29C 64/153; B33Y 10/00; B33Y 80/00; B22F 3/1055; B22F 5/007
See application file for complete search history.

(56) References Cited

U.S. PATENT DOCUMENTS 4,081,225 A * 3/1978 Yaita ...................... B29C 33/10
249/141
5,922,237 A * 7/1999 Green .................... B29C 33/10
249/141

(Continued)

FOREIGN PATENT DOCUMENTS

DE        195 43 276     2/1997
DE     10 2004 052 766   5/2006
(Continued)

*Primary Examiner* — James P Mackey
(74) *Attorney, Agent, or Firm* — Cozen O'Connor

(57) ABSTRACT

Mold (22) for vulcanizing a tire comprises a lining (2) for molding the tread of this tire and a mobile valve (1) intended to vent the mold (22). The valve is of a single piece and is guided in a guide part (200) belonging to the lining and in abutment on each side of this guide part to limit the movement of the valve in the lining. This valve and this guide part are made from the same material. The mobile valve thus produced is of one piece and non-removable from the guide part, and is therefore quicker and more accurate. It is held in the guide part by two abutments and, because it is made from the same material as the guide part, these can be produced at the same time. The mold in general comprises several valves to remove the air trapped during the molding of the tire.

10 Claims, 5 Drawing Sheets

(51) Int. Cl.
   *B22F 5/00*      (2006.01)
   *B33Y 10/00*     (2015.01)
   *B33Y 80/00*     (2015.01)
   *B29C 33/10*     (2006.01)
   *B29C 64/153*    (2017.01)

(52) U.S. Cl.
   CPC ............ *B29C 33/10* (2013.01); *B33Y 10/00* (2014.12); *B33Y 80/00* (2014.12); *B29C 64/153* (2017.08); *B29D 2030/0617* (2013.01)

(56) References Cited

U.S. PATENT DOCUMENTS

| | | | |
|---|---|---|---|
| 5,939,101 A | 8/1999 | Green | |
| 6,871,831 B1 | 3/2005 | Cuny et al. | |
| 7,850,439 B2 * | 12/2010 | Furutani | B29C 33/10 |
| | | | 264/326 |
| 2009/0053354 A1 | 2/2009 | Hajduch | |

FOREIGN PATENT DOCUMENTS

| | | | |
|---|---|---|---|
| GB | 922 788 | | 4/1963 |
| JP | 2011-116012 | * | 6/2011 |
| WO | WO 2014/060208 | | 4/2014 |

* cited by examiner

US 10,046,531 B2

MOULD FOR VULCANISING A TIRE COMPRISING MOVABLE ELEMENTS OBTAINED BY LASER SINTERING

RELATED APPLICATIONS

This is a U.S. National Phase Application under 35 USC 371 of International Application PCT/FR2015/051908 filed on Jul. 10, 2015.

This application claims the priority of French application no. 1457062 filed Jul. 22, 2014, the entire content of which is hereby incorporated by reference.

FIELD OF THE INVENTION

The present invention relates to mobile elements arranged in a lining.

BACKGROUND OF THE INVENTION

In general, these mobile elements need to be mounted in the lining, such as, for example, a mould or, more particularly, a mould for manufacturing tires, and this entails a specific step which lengthens the manufacturing process. This becomes all the more critical when the components are small in size because that entails a meticulous adjustment which further increases the manufacturing time, and, therefore, cost. It is also necessary to provide a system for holding the component in place in the lining in order to prevent it from escaping therefrom.

This mobile element in a lining may, for example, be venting using mobile valves to remove the air and which then close on contact with the rubber without leaving any nipple on the rubber.

SUMMARY OF THE INVENTION

It is an object of the present invention to provide a mobile element that is manufactured in situ and that requires neither specific fitting nor a retention system.

The One aspect of the present invention is related to a mould for vulcanizing a tire comprising a lining for moulding the tread of this tire, and a mobile valve intended to vent the mould. The valve is of a single piece, and it is guided in a guide part belonging to the lining and in abutment on each side of this guide part to limit the movement of the valve in the lining. This valve and this guide part are made from the same material.

The mobile valve thus produced is of one piece and non-removable from the guide part, which allows a saving of time and better positional accuracy; it is held in the guide part by two abutments and, because it is made from the same material as the guide part, these can be produced at the same time. The mould in general comprises several valves to remove the air trapped during the moulding of the tire.

According to one embodiment, or arrangement, the guide part belongs to a vent able to be detached from the rest of the lining. It is thus able to be added to a mould made from a different material from the mould which may for example be made of aluminium.

Advantageously, the valve has a main body, a lower end and an upper end which are wider than the main body, each end having an equivalent diameter d1, the guide part having an equivalent diameter D2, and in that d1 is greater than D2 so that the valve can come into abutment with the guide part. The valve is thus held in the guide part by its two ends which have a peripheral edge of any arbitrary shape. This edge defines a diameter equivalent to that of a circle enclosing this edge, which means that the equivalent diameter corresponds to the largest dimension of the edge.

Advantageously, the valve is able to adopt an open position and a closed position and that it is configured to lie flush in the closed position. Thus, the guide part is surmounted by a first zone of equivalent diameter D1, the upper end of the valve has an equivalent diameter d1 such that d1<D1. The upper end which defines the head of the valve thus lies flush in the closed position.

Advantageously, the ends are conical, widening towards the said ends. The valve can thus more easily position itself in the first zone of the orifice; the widening shape allows the end to be directed into the orifice.

Advantageously, the mobile valve has a guided part of height h2 and that the zone of the second diameter D2 has a height H2 that is smaller than the height h2. The difference in height between the guided part and the zone of diameter D2 of the guide part defines the travel of the valve in the guide part. Because the height h2 of the mobile valve is longer than the height H2 of the guide part of the orifice in which it is placed, the mobile valve can therefore move with an amplitude of movement equal to the difference between the two heights h2 and $H_2$.

According to a particular arrangement, the main body and the ends of the valve are cylindrical. This shape is particularly suitable when the guide part and the first zone are preferably also cylindrical.

According to another arrangement, the main body is non-cylindrical. It may, for example, be rectangular, square or triangular. In that case, the guide part and the first zone will preferably also be non-cylindrical, namely rectangular, square or triangular.

According to one particular arrangement, the upper end of the valve has an upper face with at least one blind hole. The hole is preferably central and situated on the moulding-face side; it constitutes a catching system for opening the mobile valves after the tire has been moulded. Specifically, unlike in valves of the prior art, the mobile valves according to the invention have no return spring, in this instance this function is generated by the penetration of rubber into the blind central hole, which, upon demoulding, will pull the valve upwards to open it. This hole may be straight, with an undercut, in the shape of a dovetail, may have a multi-form (cruciform, multi-hole, etc.) impression; it will also serve as the system for cleaning out the orifice by making the mobile valve move in order to clear away the rubber or other residue which may have become stuck there. This will be done either by a rotation via the hole on the interior side of the mould on the top of the mobile valve using a standard tool of the screwdriver or power screwdriver type, or using a special purpose tool. It is also possible to place a magnet in the hole in order to perform rotation using a bipolar magnet or an electromagnet.

According to another arrangement, the lower end of the valve has an underside face with a central hole that is at least partially conical. The underside face corresponds to the face on the manufacturing plate side. The hole, which may be conical, makes it possible to reduce the volume of the valve (saving on time, weight and cost of manufacture) and makes manufacturing easier because it allows the plate in the side face to be fitted with a minimum of support. All that is required is for just the lower end of the valve to be supported, the rest of the end being manufactured without support thanks to a manufacturing angle (>25°) thereby avoiding a very broad support which is then difficult to detach from the valve. The exterior hole may also serve as a system for cleaning out the orifice by making the mobile valve move in order to clear out the rubber or other residue which may have become stuck there; this will be done using a tool of cruciform type, a hexagon socket, etc.

Another aspect of the invention is related to a method for manufacturing a mobile valve in a lining or an element of a mould. The lining or the vent, the mobile valve and the guide part are produced during one and the same powder laser sintering operation.

The possibilities offered by the laser sintering method make it possible to conceive of producing this type of mobile valve without the need to assemble them. All that is required is for a clearance ranging from 0.05 mm to 1 mm to be left during manufacture. A clearance is left between the moving parts (between 0.1 and 0.5 mm preferably 0.23 mm) and mobile part supports are produced which are then broken in order to free the mobility. The mobile valve supports have a very small individual surface area of attachment to the mobile valve, just enough to be able to support the valve during manufacture but small enough to be easy to break after manufacture. The valve is manufactured at the same time as the lining, or at the same time as the vent according to its arrangement. Advantageously, a support holds the valve in the part-open position. The supports that retain the valve during manufacture are dimensioned in such a way that the main body of the valve is distant from the guide part and that the ends are distant from the sides of the orifice so that the valve can easily be detached from the lining to which it is connected.

Advantageously, an at least 0.1 mm thickness of non-fused powder is left between the valve and the guide part. The space in which the powder is unfused by sintering leaves an empty space between the components which can thus move relative to one another. The thickness of 0.1 mm is enough that if one part is fused the link will be weak enough to break easily when an attempt is made to move one of the components.

DETAILED DESCRIPTION OF THE DRAWINGS

In the description, the top will correspond to the top of the figures and the bottom to the bottom of the figures.

Figure 1:
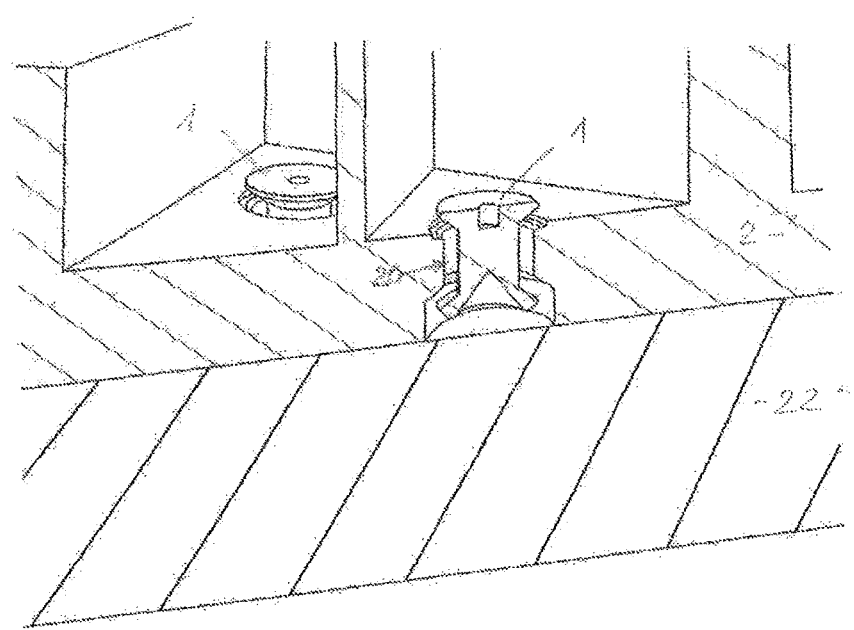
FIG. 1 depicts a perspective view of a mould according to an embodiment of the invention.

The assembly illustrated in FIG. 1 comprises a mobile valve 1 arranged in a lining 2 and a mould 22. The lining 2 comprises an orifice 20 in which the valve 1 is arranged. The valve 1 is made as a single piece (in one piece) and cannot be removed from the lining 2. The lining 2 is placed in the mould 22.

Figure 2:
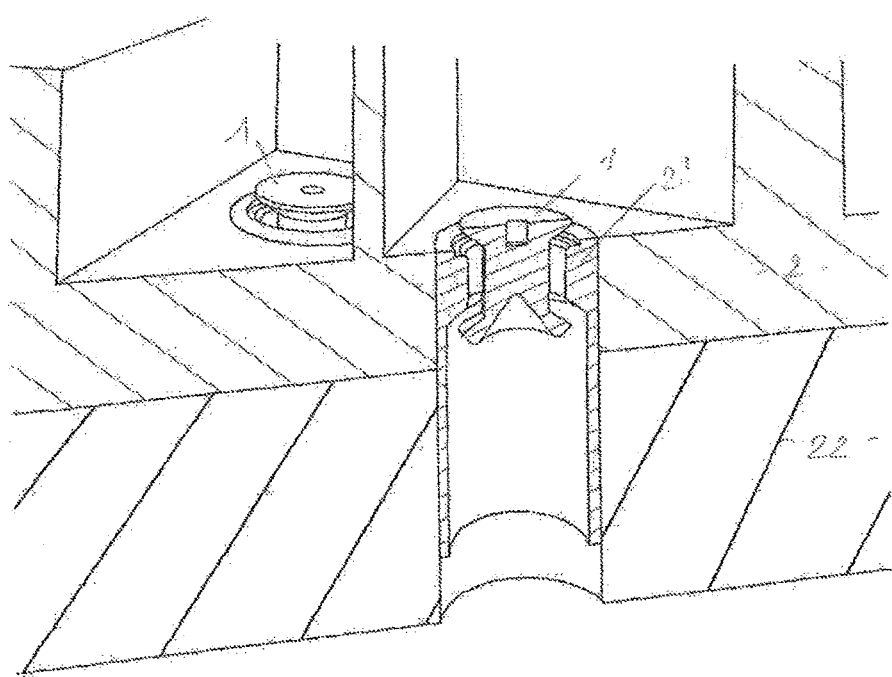
FIG. 2 is a perspective view of a second alternative form of mould according to an embodiment of the invention.
Figure 3:
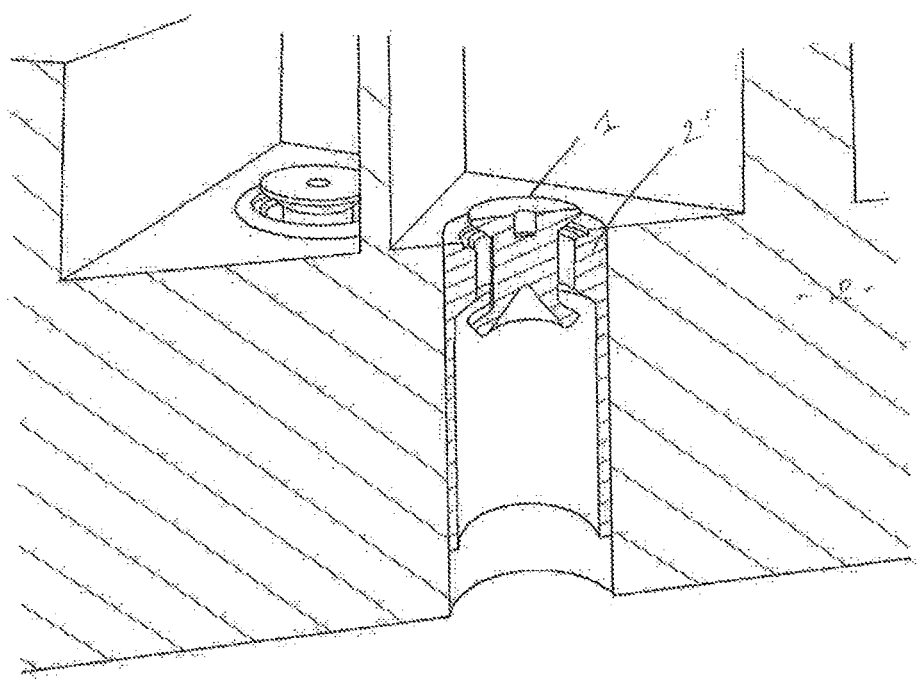
FIG. 3 depicts a perspective view of a third alternative form of mould according to an embodiment of the invention.

In the alternative form in FIG. 2, the mobile valve 1 is placed in a vent 2'. Here again, the valve 1 is of one piece and non-removable. The vent 2' is intended to be placed in a lining 2. The mould 22 may be made of the same material as the valve and the vent (FIG. 2) or from a different material such as aluminium (FIG. 3).

Figure 4:
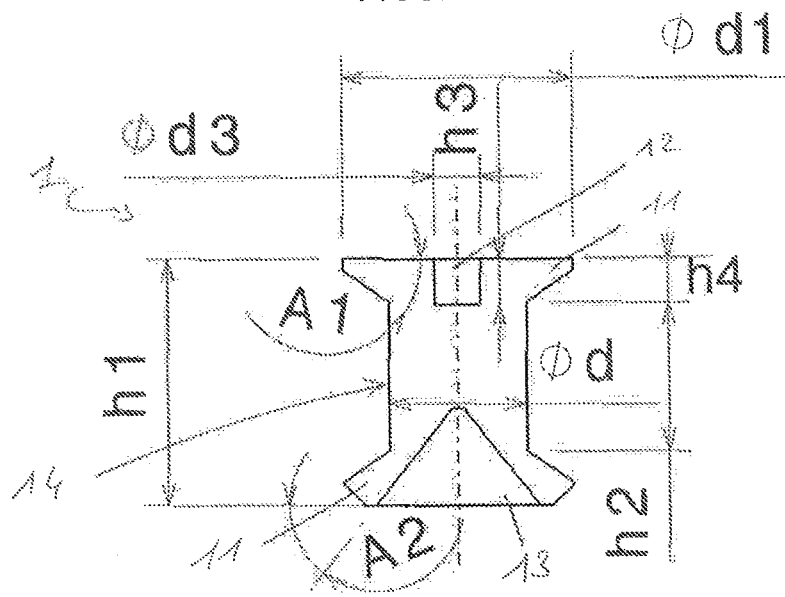
FIG. 4 is a cross section of the mobile valve.

FIG. 4 depicts the features of one example of mobile valve 1. This mobile valve 1 has a cylindrical diameter d with ends 11 of diameter $d_1$, its overall height is $h_1$ and the height corresponding to the cylindrical part is $h_2$. The ends 11 are conical widening towards the end with an angle A1 in the case of the upper end and an angle A2 in the case of the lower end. The valve 1 has a hole 12 of diameter $d_3$ and of height $h_3$. It also has a recess 13 in its lower part. The part of diameter d constitutes a guided part 14.

Figure 5:
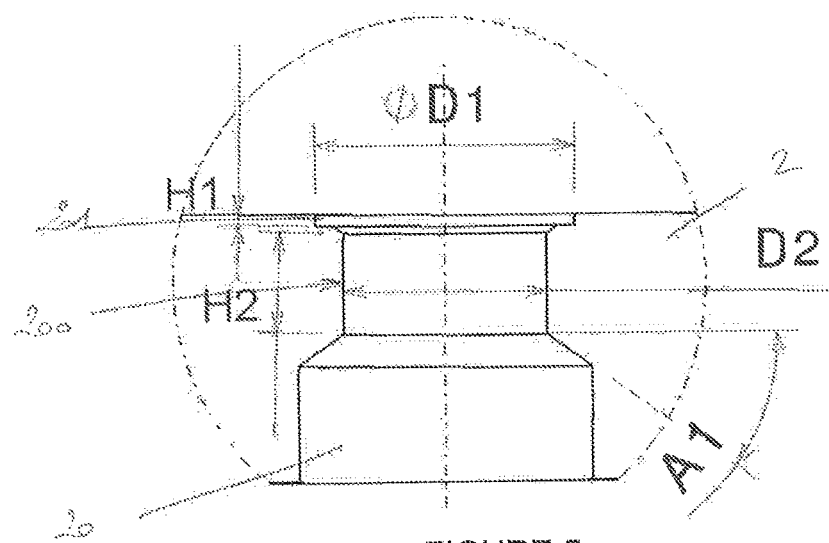
FIG. 5 is a view in cross section of the orifice.

FIG. 5 shows the mould 2 with the orifice 20. The orifice 20 is substantially cylindrical in shape with a zone 201 of a first diameter $D_1$ in the upper part and a zone 200 of a second diameter $D_2$ smaller than the first diameter $D_1$ below this, the zone 200 constitutes the guide part of the valve 1. $D_2$ is greater than the diameter d of the mobile valve 1. The first zone 201 has a height $H_1$ and the second zone 200 has a height $H_2$.

Figures 6, 7:
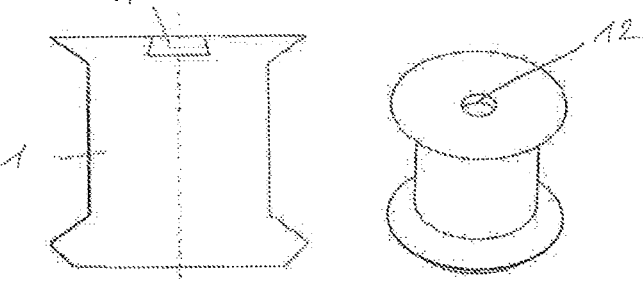
FIGS. 6 and 7 are views in cross section and in perspective of a first example of hole in the mobile valve.
Figures 8, 9:
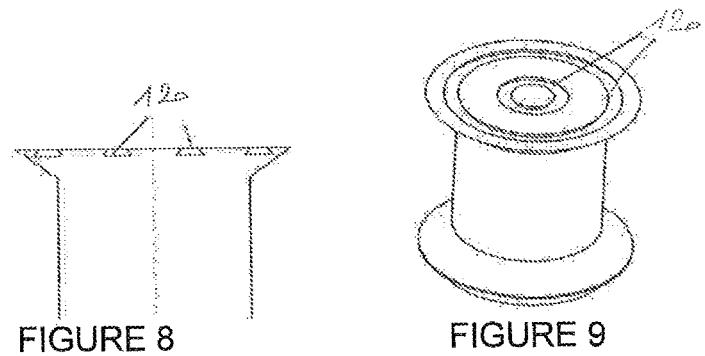
FIGS. 8 and 9 are views in cross section and in perspective of a second example of hole in the mobile valve.
Figures 10, 11, 12, 13:
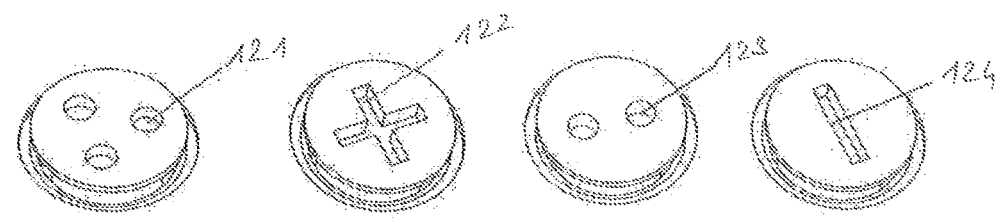
FIGS. 10 to 13 are other examples of holes in the mobile valve.

FIGS. 6 and 7 illustrate an example of a hole 12 with an undercut, FIGS. 8 and 9 a hole 120 in the shape of a dovetail, FIGS. 10 and 12 multiple holes (three holes 121 or two holes 123), FIG. 11 the hole 122 is cruciform, and in FIG. 13 the hole 124 is linear.

Figure 14:
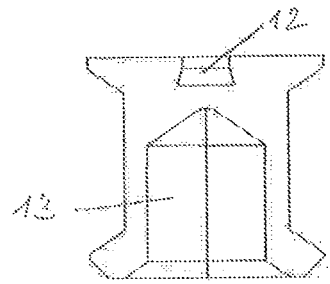
FIGS. 14 and 15 are views in cross section and in perspective of another example of hole in the mobile valve.
Figure 15:
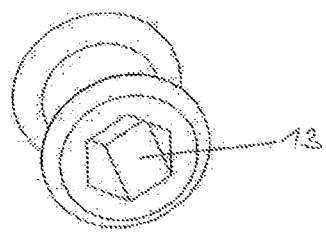

The mobile valve 1 also has a recess 13 in its bottom part which in FIGS. 14 and 15 is hexagon socket shaped, so that it can be actuated, but it could also be cruciform thus constituting an attachment system.

Figure 16:
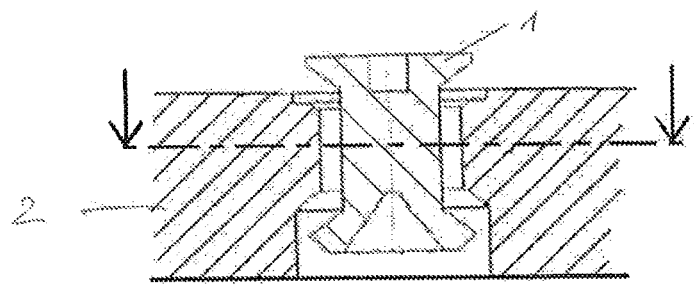
FIG. 16 is a view in cross section of the valve.
Figure 17:
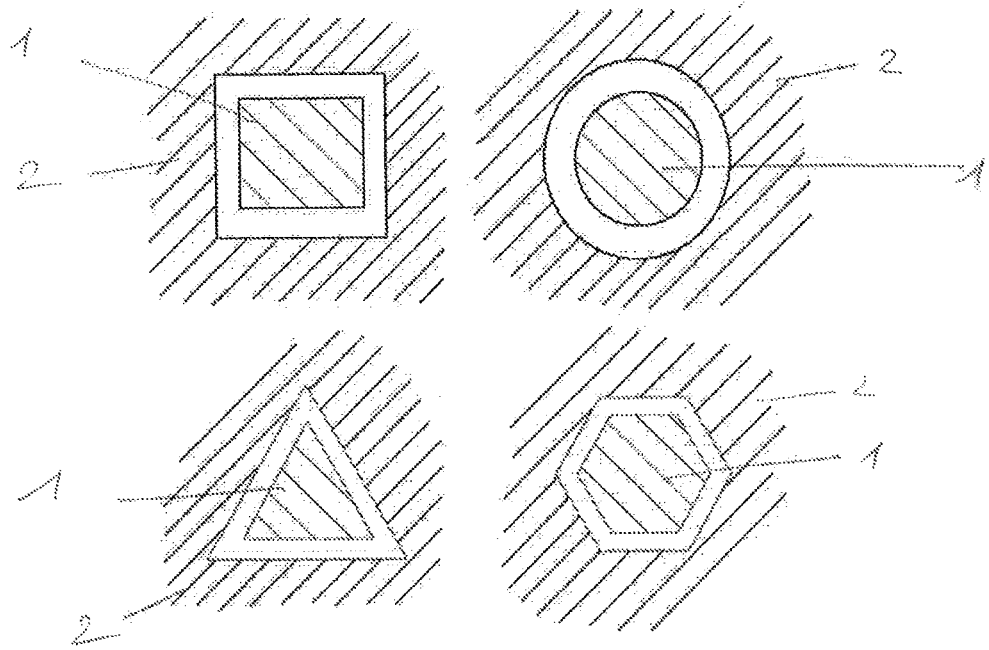
FIG. 17 depicts various cross sections of the valve of FIG. 16.

The valve illustrated in cross section in FIG. 16 may have a rectangular, square, triangular or hexagonal (FIG. 17) profile, in which case the orifice preferably has a similar profile a few tenths of a millimeter wider so as to allow the valve to move.

Figure 18:
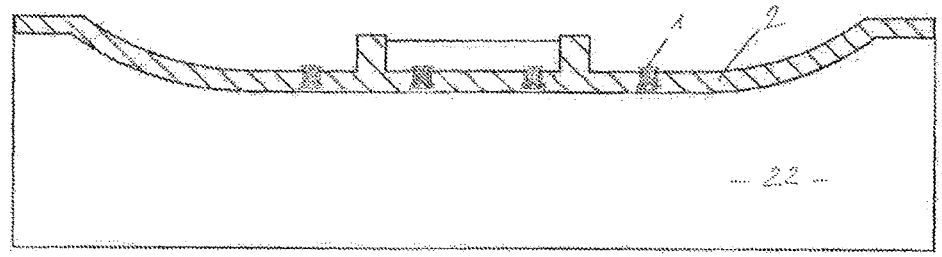
FIG. 18 is a view in cross section of the mould of FIG. 1.

FIG. 18 shows a complete mould 22 with valves 1 according to the embodiment of FIG. 1.

Figure 19:
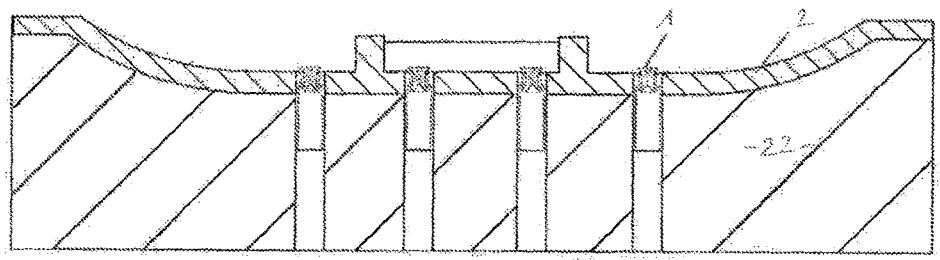
FIG. 19 is a view in cross section of the mould of FIG. 2.

FIG. 19 shows a complete mould 22 with vents 2' like those illustrated in FIG. 2.

Figure 20:
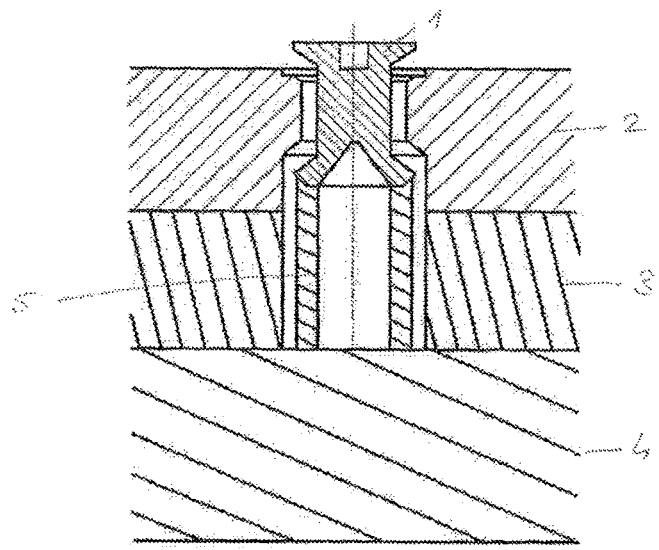
FIG. 20 is a view in cross section of the mould with the valve during manufacture.

The method of manufacture will now be described. FIG. 20 shows a valve in a manufacturing support, this support comprises a manufacturing platen 4, lining supports 3, and valve supports 5. The lining 2 and the mobile valve 1 are produced as a single piece by powder laser sintering, the mobile valve 1 is connected to the manufacturing platen by valve supports 5 so as to produce a single piece. The recess 13 allows the lower end of the valve to be supported, this lower end thus being smaller in size, and the rest of the end is manufactured without support thanks to a manufacturing angle >25°, thereby avoiding the use of a very broad support for creating an underside surface of the valve which is rectilinear and which would then be difficult to detach from the valve.

The supports 5 comprise more slender parts (which have not been depicted) connected to the valve 1, which are broken and removed in order to be able to render the valve mobile. The hole 12 which constitutes a catching system may allow the mobile valve 1 to be made to move in order to detach the support elements 5 from the mobile valve 1.

The lining supports 3 are removed by machining the rear face of the lining 2. The supports 5 may also be broken during the phase of machining the back of the lining 2.

In the event of the lining 2 being manufactured at an angle, valve supports 5 are not necessarily required under the valves. This is because the 0.1 mm clearance between the valve and the lining may allow powder to agglomerate locally by diffusion of the heat of melting and therefore allow local attachment, this agglomeration will be broken by making the valve 1 move.

In use, the mobile valve 1 is open when it is positioned in a raised position and closed in a lowered position. This mobile valve 1 allows venting in the tire manufacturing mould 22 by removing air trapped during the moulding of the tire. The mobile valve 1 is opened by adhesion of rubber to the mobile valve 1 or by the penetration of rubber into the blind central hole 12 which, upon demoulding, will pull it upwards.

The mobile valve 1 is made to close by the pressure of the rubber in contact with it at the time of moulding. The surface roughness obtained using this method allows a small degree of venting even after closure. The hole 12 also constitutes a cleaning system, by making the mobile valve 1 move in order to clear out the rubber or other residue that has become stuck, turning will be performed via the hole 12 on the top of the mobile valve 1 using a standard tool of the screwdriver or power screwdriver type or using a special purpose tool.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A mould for vulcanizing a tire comprising:
   a lining for moulding the tread of this tire,
   a mobile valve configured to vent the mould, wherein the valve is of a single piece, and
   a guide part comprising a portion of the lining and configured to guide the valve, the valve being in abutment on each side of said guide part to limit movement of the valve in the lining, and
   wherein said valve and said guide part are made from the same material, and the valve is nonremovable from the guide part.

2. The mould according to claim 1, wherein the guide part comprises a part of a vent able to be detached from the lining.

3. The mould according to claim 1, wherein the valve has a main body, a lower end and an upper end which are wider than the main body, each said end having a diameter d1, the guide part having a diameter D2, and wherein d1 is greater than D2 so that the valve can come into abutment with the guide part.

4. The mould according to claim 1, wherein the valve is able to adopt an open position and a closed position and wherein the valve is configured to lie flush with the lining in the closed position.

5. The mould according to claim 3, wherein the ends are conical, widening towards said ends.

6. The mould according to claim 3, wherein the mobile valve has a guided part of height h2 and that a zone of the diameter D2 of the guide part has a height $H_2$ that is smaller than the height h2.

7. The mould according to claim 3, wherein the main body and the guide part and the ends of the valve are cylindrical.

8. The mould according to claim 3, wherein the main body and the guide part are non-cylindrical.

9. The mould according to claim 3, wherein the upper end of the valve has an upper face with at least one blind hole.

10. The mould according to claim 3, wherein the lower end of the valve has an underside face with a central hole that is at least partially conical.

\* \* \* \* \*